US012615103B2

(12) United States Patent
Fu

(10) Patent No.: US 12,615,103 B2
(45) Date of Patent: Apr. 28, 2026

(54) BLIND DETECTION CAPABILITY OPTIMIZATION METHOD AND APPARATUS

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 435 days.

(21) Appl. No.: 18/003,092

(22) PCT Filed: Jul. 9, 2020

(86) PCT No.: PCT/CN2020/101086
§ 371 (c)(1),
(2) Date: Dec. 22, 2022

(87) PCT Pub. No.: WO2022/006813
PCT Pub. Date: Jan. 13, 2022

(65) Prior Publication Data
US 2023/0261783 A1 Aug. 17, 2023

(51) Int. Cl.
*H04L 1/00* (2006.01)
*H04L 27/26* (2006.01)
*H04W 72/232* (2023.01)

(52) U.S. Cl.
CPC ...... *H04L 1/0038* (2013.01); *H04L 27/26025* (2021.01); *H04W 72/232* (2023.01)

(58) Field of Classification Search
CPC ............. H04L 1/0038; H04L 27/26025; H04L 5/0007; H04L 5/0053; H04L 5/0094; H04W 72/232
See application file for complete search history.

(56) References Cited

U.S. PATENT DOCUMENTS

2021/0143937 A1* 5/2021 Ma .................... H04W 52/0229
2021/0144571 A1 5/2021 Ji
(Continued)

FOREIGN PATENT DOCUMENTS

CN 109391967 A 2/2019
CN 110740514 A 1/2020
(Continued)

OTHER PUBLICATIONS

International Search Report and Written Opinion of International Application No. PCT/CN2020/101086, mailed Mar. 30, 2021, 13 pages.
(Continued)

*Primary Examiner* — Awet Haile

(74) *Attorney, Agent, or Firm* — Finnegan, Henderson, Farabow, Garrett & Dunner, L.L.P.

(57) ABSTRACT

A method for optimizing a blind detection capability is performed by a terminal, and includes: determining blind detection capability information, wherein the blind detection capability information includes a maximum number of physical downlink control channel (PDCCH) candidates monitored in n time slots under a first subcarrier spacing, and a maximum number of non-overlapped control channel elements (CCEs) in the n time slots under the first subcarrier spacing, where n is an integer greater than 1.

9 Claims, 6 Drawing Sheets

(56)  References Cited

U.S. PATENT DOCUMENTS

| | | | |
|---|---|---|---|
| 2022/0104201 A1 * | 3/2022 | Takeda ................. | H04W 72/20 |
| 2023/0119439 A1 * | 4/2023 | Kim ................. | H04L 27/26025 |
| | | | 370/329 |
| 2023/0141339 A1 * | 5/2023 | Kittichokechai ..... | H04W 24/08 |
| | | | 370/329 |
| 2024/0215037 A1 * | 6/2024 | Wang ............... | H04W 72/0446 |

FOREIGN PATENT DOCUMENTS

| | | | |
|---|---|---|---|
| CN | 110831181 A | 2/2020 | |
| EP | 3817257 A1 | 5/2021 | |
| WO | WO 2019192304 A1 | 10/2019 | |
| WO | WO 2020015623 A1 | 1/2020 | |

OTHER PUBLICATIONS

European Patent Office, Extended European Search Report issued in Application No. 20944746.5, dated Jul. 20, 2023, 8 pages.

\* cited by examiner determining blind detection capability information, in which, the blind detection capability information includes a maximum number of physical downlink control channel (PDCCH) candidates monitored in each n time slots under a first subcarrier spacing, and/or a maximum number of non-overlapped control channel elements (CCEs) in each n time slots under a first subcarrier spacing, where n is an integer greater than 1

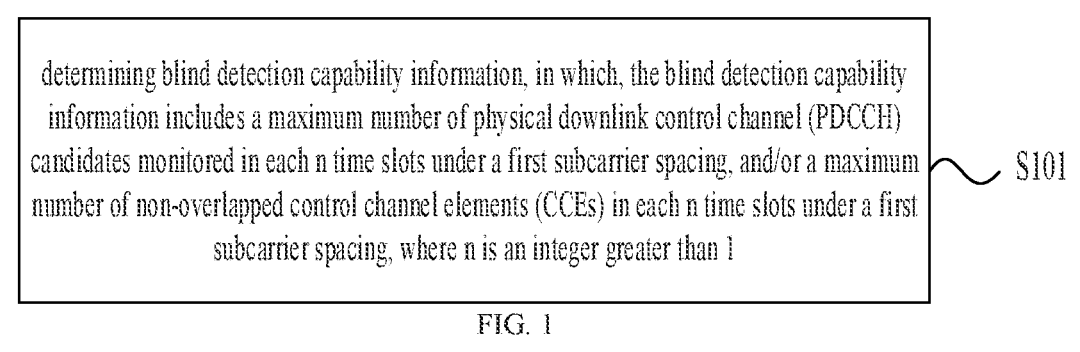

$\sim$ S101

FIG. 1

| $\mu$ | Maximum number of monitored PDCCH candidates per slot per serving cell $M_{PDCCH}^{max,slot,\mu}$ |
|---|---|
| 0 | 44 |
| 1 | 36 |
| 2 | 22 |
| 3 | 20 |

FIG. 2A

| $\mu$ | Maximum number of non-overlapped CCEs per slot per serving cell $C_{PDCCH}^{max,slot,\mu}$ |
|---|---|
| 0 | 56 |
| 1 | 56 |
| 2 | 48 |
| 3 | 32 |

FIG. 2B

| $\mu$ | Maximum number of monitored PDCCH candidates per n slot per serving cell $M_{PDCCH}^{max,slot,\mu}$ |
|---|---|
| 4 | A1 |
| 5 | A2 |
| 6 | A3 |

FIG. 3A

| $\mu$ | Maximum number of non-overlapped CCEs per n slot per serving cell $C_{PDCCH}^{max,slot,\mu}$ |
|---|---|
| 4 | B1 |
| 5 | B2 |
| 6 | B3 |

FIG. 3B

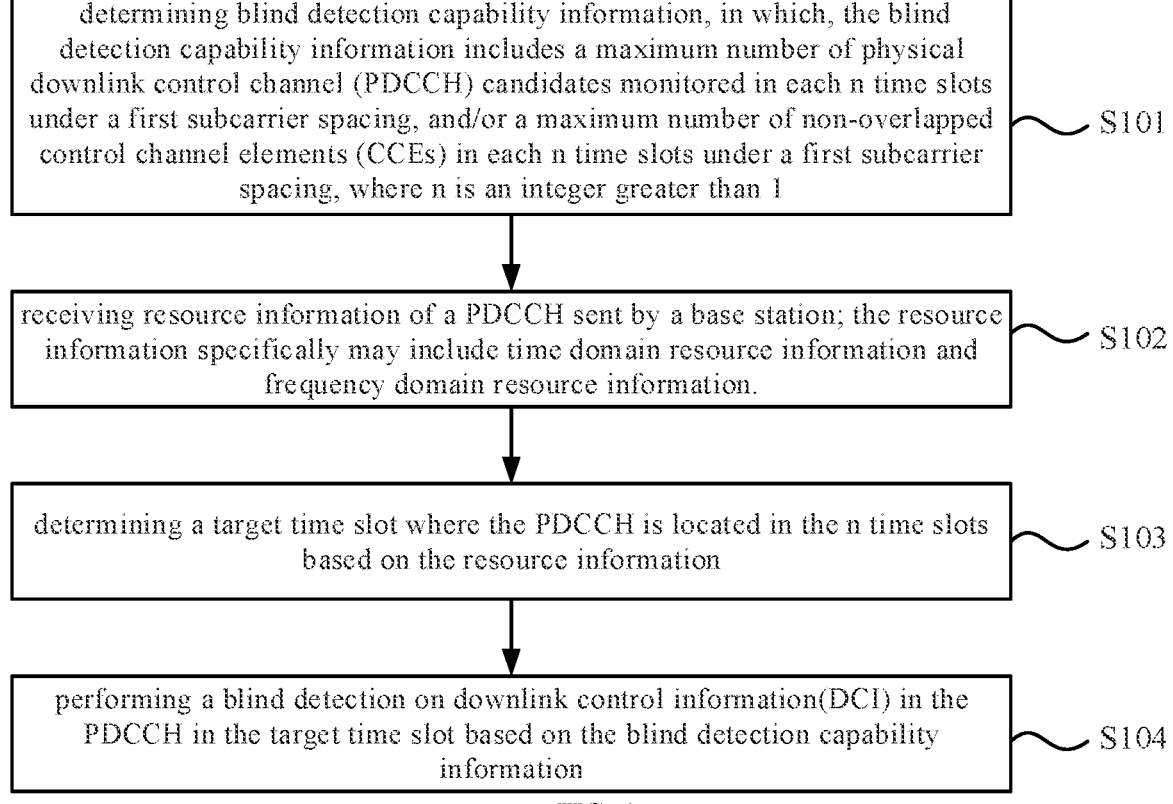

determining blind detection capability information, in which, the blind detection capability information includes a maximum number of physical downlink control channel (PDCCH) candidates monitored in each n time slots under a first subcarrier spacing, and/or a maximum number of non-overlapped control channel elements (CCEs) in each n time slots under a first subcarrier spacing, where n is an integer greater than 1 ~ S101 receiving resource information of a PDCCH sent by a base station; the resource information specifically may include time domain resource information and frequency domain resource information. ~ S102 determining a target time slot where the PDCCH is located in the n time slots based on the resource information ~ S103 performing a blind detection on downlink control information(DCI) in the PDCCH in the target time slot based on the blind detection capability information ~ S104

FIG. 4

BLIND DETECTION CAPABILITY OPTIMIZATION METHOD AND APPARATUS

CROSS-REFERENCE TO RELATED APPLICATION

This application is the US national phase application of International Application No. PCT/CN2020/101086, filed on Jul. 9, 2020, the entire contents of which are incorporated herein by reference.

TECHNICAL FIELD

The disclosure relates to a field of communication technologies, specifically to a method and an apparatus for optimizing a blind detection capability, an electronic device and a computer readable storage medium.

BACKGROUND

In a communication process between a terminal and a base station, the terminal may perform a blind detection on a physical downlink control channel (PDCCH) in order to acquire downlink control information (DCI) sent by the base station. In the related art, a blind detection capability of the terminal is defined for each time slot. However, there exists some problems with such configuration.

Specifically, the terminal communicates with the base station mainly in a frequency band below 52.6 GHz, in which case, a subcarrier spacing (SCS) of communication may be 15 kHz, 30 kHz, 60 kHz or 120 kHz. and a length of one time slot in a time domain is related to a subcarrier. For example, when the SCS is 15 kHz, one time slot is 1 ms, when the SCS is 30 kHz, one time slot is 0.5 ms, and when the SCS is 60 kHz, one time slot is 0.25 ms, that is, the larger the SCS, the shorter the length of the time slot in the time domain.

However, with expansion of the frequency band, the terminal and the base station need to communicate at a frequency band above 60 GHz. In a high frequency band, in order to cope with phase noise, the SCS needs to be expanded. For example, the SCS is 960 kHz, in which case, one time slot is 0.015625 ms, that is, $\frac{1}{64}$ ms.

It can be seen that during a high-frequency band communication, the length of one time slot is far less than 1 ms. However, a processing capability of the terminal is limited. In an extremely short time slot, it may be difficult to schedule a physical uplink shared channel (PUSCH)/physical downlink shared channel (PDSCFI) based on the DCI in each time slot, in which case, the base station may not configure a PDCCH carrying DCI in each time slot. Therefore, when the blind detection capability of the terminal is defined for each time slot, the blind detection capability of the terminal must be dispersedly used in each time slot, so that the terminal may not concentrate the blind detection capability only in a time slot configured with the PDCCH for blind detection, thus wasting computing resources of the terminal.

SUMMARY

According to a first aspect of the present disclosure, a method for optimizing a blind detection capability is provided, which is performed by a terminal. The method includes:

determining blind detection capability information, in which the blind detection capability information includes a maximum number of physical downlink control channel (PDCCH) candidates monitored in each n time slots under a first subcarrier spacing, and a maximum number of non-overlapped control channel elements (CCEs) in each n time slots under a first subcarrier spacing, where n is an integer greater than 1.

According to a second aspect of the present disclosure, an electronic device is provided, and includes:

a processor; and a memory configured to store instructions executable by the processor;

in which the processor is configured to implement the method as described in the above embodiment.

According to a third aspect of the present disclosure, a non-transitory computer readable storage medium with a computer program stored thereon is provided. The program implements the method when executed by a processor.

BRIEF DESCRIPTION OF THE DRAWINGS

In order to explain the technical solutions in embodiments of the present disclosure more clearly, the drawings described in the embodiments will be briefly introduced below. Obviously, the diagrams described as below are only example embodiments of the present disclosure.

FIG. 1 is a flow diagram illustrating a method for optimizing a blind detection capability according to embodiments of the present disclosure.

FIG. 2A and FIG. 2B are diagrams illustrating blind detection capability information in the related art.

FIG. 3A and FIG. 3B are diagrams illustrating blind detection capability information according to embodiments of the present disclosure.

FIG. 4 is a flow diagram illustrating another method for optimizing a blind detection capability according to embodiments of the present disclosure.

DETAILED DESCRIPTION

Figure 5:
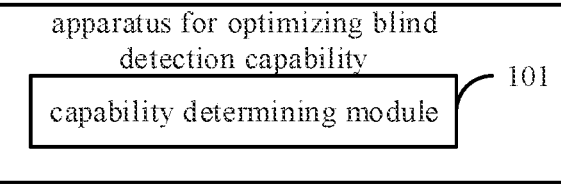
FIG. 5 is a schematic block diagram illustrating an apparatus for optimizing a blind detection capability according to embodiments of the present disclosure.

Example embodiments of the present disclosure will be described below in combination with the appended drawings. On the basis of embodiments of the present disclosure, all other embodiments obtained by those skilled in the art without creative work are within the protection scope of the present disclosure.

FIG. 1 is a flow diagram illustrating a method for optimizing a blind detection capability according to embodiments of the present disclosure. The method as illustrated in the embodiment may be applicable to a terminal, and the terminal as a user equipment (UE) may communicate with a base station. The base station may be a 5G base station, and the terminal includes but not limited to a mobile phone, a tablet computer, a wearable device, a sensor, an Internet of things device and other electronic devices.

As illustrated in FIG. 1, the method for optimizing a blind detection capability includes the following steps.

At step S101, blind detection capability information is determined. The blind detection capability information includes a maximum number of physical downlink control channel (PDCCH) candidates monitored in each n time slots under a first subcarrier spacing, and/or a maximum number of non-overlapped control channel elements (CCEs) in each n time slots under a first subcarrier spacing, where n is an integer greater than 1.

It needs to be noted that, the maximum number of the non-overlapped CCEs in each n time slots under the first subcarrier spacing, for the terminal, specifically may be the maximum number of the non-overlapped CCEs capable of performing a blind detection in each n time slots under the first subcarrier spacing.

In an embodiment, the blind detection capability information determined by the terminal may be prestored in the terminal, and for example, may be information pre-specified in a communication protocol between the terminal and the base station.

The blind detection capability information may mainly include two aspects: the maximum number of the PDCCH candidates monitored in each n time slots under the first subcarrier spacing, and/or the maximum number of the non-overlapped CCEs in each n time slots under the first subcarrier spacing, where n is an integer greater than 1.

In the related art, the maximum number of the PDCCH candidates monitored in each time slot may be as illustrated in FIG. 2A. The maximum number of the non-overlapped CCEs in each time slot may be as illustrated in FIG. 2B.

In an embodiment, the maximum number of the PDCCH candidates monitored in each time slot under the first subcarrier spacing may be as illustrated in FIG. 3A, and stored in the terminal as a table. The maximum number of the non-overlapped CCEs in each n time slots under the first subcarrier spacing may be as illustrated in FIG. 3B, and stored in the terminal as a table.

As illustrated in FIG. 2A and FIG. 2B, in the related art, the blind detection capability information of the terminal is defined for each time slot. For example, in FIG. 2A, in case of u=0, the subcarrier spacing is 15 kHz, the maximum number of the PDCCH candidates monitored in each time slot is 44, and the maximum number of the non-overlapped CCEs in each time slot is 56.

FIG. 3A and FIG. 3B only illustrates the case when u is 4, 5 or 6, that is, when the subcarrier spacing is 240 kHz, 480 kHz or 960 kHz. In case that u is 0, 1, 2, or 3, a corresponding configuration may be made as required. Specific values A1, A2 and A3 in FIG. 3A and specific values B1, B2 and B3 in FIG. 3B may be set based on actual situations.

For different subcarrier spacings, n may be different, or may be the same; for different subcarrier spacings, the maximum number of PDCCH candidates monitored in each n time slots may be different, or may be the same; for different subcarrier spacings, the maximum number of non-overlapped CCEs in each n time slots may be different, or may be the same.

Taking n=4 as an example, when the subcarrier spacing is 960 kHz, the maximum number of the PDCCH candidates in each four time slots is 16, and the maximum number of the non-overlapped CCEs in each four time slots is 20. In the related art, since the blind detection capability of the terminal is configured for each time slat, when the subcarrier spacing is 960 kHz, if the blind detection capability of the terminal is the same as that in the above embodiment of the present disclosure, the maximum number of the PDCCH candidates configured for each time slot is 4, and the maximum number of the non-overlapped CCEs in each time slat is 5.

For example, the terminal determines that the base station configures a PDCCH within a target time slot in four time slots based on resource information of the PDCCH sent by the base station.

Based on the blind detection capability in the related art, the terminal may only monitor maximum four PDCCH candidates in the target time slat, and maximum five non-overlapped CCEs. Since the blind detection capability is configured for each time slot, a part of blind detection capability is dispersed in a time slot where a PDCCH is not configured, which causes the waste of the blind detection capability. The number of the PDCCH candidates monitored in the target time slot is too small, so that the base station may only select a time-frequency resource for carrying scheduled DCI on a very limited time-frequency resource position, a time-frequency domain diversity gain is difficult to the acquired, and the PDCCH is easy to be blocked when there is other DCI to be transmitted.

According to embodiments of the present disclosure, since the blind detection capability is configured for each n time slots, the terminal may flexibly apply the blind detection capability in the n time slots based on actual conditions. For example, when it is determined that the base station configures a PDCCH within the target time slot in four time slots, a full blind detection capability may be applied to the target time slot. Therefore, maximum 16 PDCCH candidates and maximum 20 non-overlapped CCEs may be monitored in the target time slot. Accordingly, the blind detection capability will not be wasted, and the number of the PDCCH candidates monitored in the target time slot is sufficient, which is beneficial to acquiring the time-frequency domain diversity gain and reducing the blocking probability of DCI.

It needs to be noted that, a number of the target time slots may be less than or equal to n, and specifically may be determined based on resource information of the PDCCH configured by the base station.

Optionally, the first subcarrier spacing is greater than 120 KHz.

Optionally, the first subcarrier spacing is one of: 240 KHz, 480 KHz or 960 KHz.

It needs to be noted that, a range of the first subcarrier spacing is not limited to 240 KHz, 480 KHz or 960 KHz, and may be adjusted as required, for example, the first subcarrier spacing further may include a spacing less than 240 KHz or a spacing greater than 960 KHz, and specifically may be 1920 KHz.

In an embodiment, when the subcarrier spacing (that is, the first subcarrier spacing) is larger, the blind detection capability information determined by the terminal is as described in the above embodiments, that is, the maximum number of the PDCCH candidates monitored in each n time slots under the first subcarrier spacing, and/or the maximum number of the non-overlapped control channel elements (CCEs) in each n time slots under the first subcarrier spacing.

When the subcarrier spacing is larger, and a length of the time slot is short, according to the processing capability of the terminal, it is difficult to schedule a PDCCH in each time slot; in which case, the base station is more likely to configure PDCCH candidates in the target time slot in each n time slots. Therefore, the detection capability information determined by the terminal in this case may be configured for each n time slots, so that a full blind detection capability is applied to the target time slot in the above embodiment.

In an embodiment, the terminal may report the processing capability to the base station, so that the base station determines whether the PDCCH candidates need to be configured in the target time slot in each n time slots. For example, when the processing capability of the terminal is weak, a volume of data that may be processed in a unit time is greater than a preset value, and the base station configures the PDCCH candidates in the target time slot in each n time slots; when the processing capability of the terminal is strong, the base station configures the PDCCH candidates in the target time slot in each time slot and specifically, the volume of data that may be processed in the unit time is less than the preset value.

Optionally, the blind detection capability information further includes a maximum number of PDCCH candidates monitored in each time slot under a second subcarrier spacing, and/or a maximum number of non-overlapped CCEs in each time slot under a second subcarrier spacing, in which, the second subcarrier spacing is less than the first subcarrier spacing.

Optionally, the second subcarrier spacing is one of: 15 KHz, 30 KHz, 60 KHz or 120 KHz.

It needs to be noted that, the second subcarrier spacing and the first subcarrier spacing in the above embodiment are subcarrier spacings of communication between the terminal and the base station. In general, in one communication process, the subcarrier spacing is fixed, while in different communication processes, for example, when the terminal disconnects a communication connection with the base station, and accesses the base station again to communicate with the base station, the subcarrier spacing may be different from the subcarrier spacing in a previous communication.

In an embodiment, when the subcarrier spacing (that is, the second subcarrier spacing) is small, the blind detection capability information determined by the terminal may be the maximum number of the PDCCH candidates monitored in each time slot, and/or the maximum number of the non-overlapped CCEs in each time slot under the second subcarrier spacing.

When the subcarrier spacing is large, and the length of the time slot is long, the processing capability of the terminal makes it easy to schedule the PDCCH in each time slot, in which case, it is more likely that the base station configures PDCCH candidates in the target time slot in each time slot. Therefore, the blind detection capability information determined by the terminal in this case may be configured for each time slot, without needing the terminal to calculate how to allocate the blind detection capability in each time slot, which is beneficial to reducing a workload of the terminal.

FIG. 4 is a flow diagram illustrating another method for optimizing a blind detection capability according to embodiments of the present disclosure. As illustrated in FIG. 4, the method further includes the following steps.

At step S102, resource information of a PDCCH sent by a base station is received; the resource information specifically may include time domain resource information and frequency domain resource information.

At step S103, a target time slot where the PDCCH is located in the n time slots is determined based on the resource information.

At step S104, a blind detection is performed on downlink control information (DCI) in the PDCCH in the target time slot based on the blind detection capability information.

Optionally, the resource information includes a control resource set and a search space.

In an embodiment, the base station may send the resource information of the PDCCH to the terminal, the resource information may include a control resource sot (CO-RE-SET) and a search space, and the terminal may determine the target time slot where the PDCCH is located in n time slots based on the resource information, in which case, the terminal may perform a blind detection on DCI in the PDCCH in the target time slot based on the blind detection capability information.

It should be noted that, the target time slot may be one time slot in each n time slots, or may be a plurality of time slots in each n time slots, and when the target time slot is a plurality of time slots in each n time slots, the terminal may evenly divide the blind detection capability in each time slot of the plurality of time slots.

For example, n is 4, and the target time slot is a third time slat in each four time slots. In this case, the terminal may apply a full blind detection capability to the third time slot in each four time slots, so as to monitor a sufficient number of PDCCH candidates in the target time slot, thereby facilitating detection of the PDCCH carrying the DCI.

For example, n is 4, and the target time slot is second and third time slots in each four time slots. In this case, the terminal may evenly divide the full blind detection capability in the second and third time slots, so as to detect the PDCCH carrying the DCI within the two target time slots with the same probability.

Corresponding to embodiments of the method for optimizing the blind detection capability, embodiments of an apparatus for optimizing a blind detection capability are further provided in the present disclosure.

FIG. 5 is a schematic block diagram illustrating an apparatus for optimizing a blind detection capability according to embodiments of the present disclosure. The apparatus as illustrated in the embodiment may be applicable to a terminal, and the terminal as a user equipment (UE) may communicate with a base station. The base station may be a 5G base station, and the terminal includes but not limited to a mobile phone, a tablet computer, a wearable device, a sensor, an Internet of things device and other electronic devices.

As illustrated in FIG. 5, the apparatus for optimizing the blind detection capability may include a capability determining module 101.

The capability determining module 101 is configured to determine blind detection capability information. The blind detection capability information includes a maximum number of physical downlink control channel (PDCCH) candidates monitored in each n time slots under a first subcarrier spacing, and/or a maximum number of non-overlapped control channel elements (CCEs) in each n time slots under a first subcarrier spacing, where n is an integer greater than 1.

Optionally, the first subcarrier spacing is greater than 120 KHz.

Optionally, the first subcarrier spacing is one of: 240 KHz, 480 KHz or 960 KHz.

Optionally, the blind detection capability information further includes a maximum number of PDCCH candidates monitored in each time slot under a second subcarrier spacing, and/or a maximum number of non-overlapped CCEs in each time slot under a second subcarrier spacing, in which, the second subcarrier spacing is less than the first subcarrier spacing.

Optionally, the second subcarrier spacing is one of: 15 KHz, 30 KHz, 60 KHz or 120 KHz.

Figure 6:
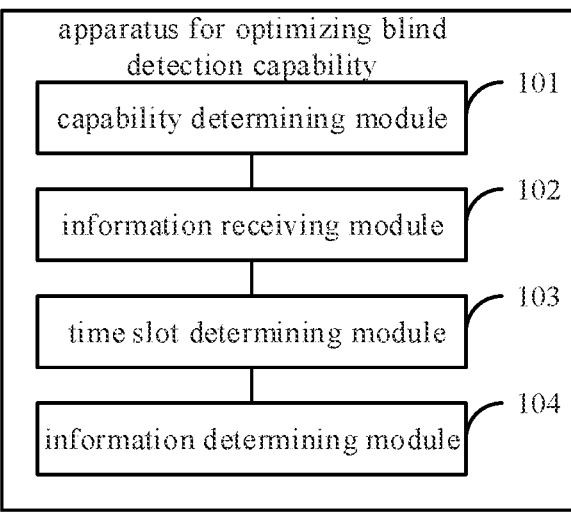
FIG. 6 is a schematic block diagram illustrating another apparatus for optimizing a blind detection capability according to embodiments of the present disclosure.

FIG. 6 is a schematic block diagram illustrating another apparatus for optimizing a blind detection capability according to embodiments of the present disclosure. As illustrated in FIG. 6, the apparatus further includes an information receiving module 102, a time slot determining module 103 and an information determining module 104.

The information receiving module 102 is configured to receive resource information of a PDCCH sent by a base station.

The time slot determining module 103 is configured to determine a target time slot where the PDCCH is located in the n time slots based on the resource information.

The information determining module 104 is configured to perform a blind detection on downlink control information in the PDCCH in the target time slot based on the blind detection capability information.

Optionally, the resource information includes a control resource set and a search space.

With regard to the apparatus in the above embodiments, the specific way each module performs the operation has been described in detail in the embodiments of the method and will not be elaborated here.

The apparatus embodiments refer to part of descriptions of the method embodiments since they corresponds to the method embodiments. The above apparatus embodiments are only schematic, in which the above modules described as separate parts may or may not be physically separated, the parts shown as modules may or may not be physical modules, that is, may be located in one place, or may be distributed on a plurality of network modules. Some or all modules may be selected according to the actual requirements to achieve the purpose of the present disclosure. Those skilled in the art may understand and implement it without any creative effort.

According to embodiments of the present disclosure, an electronic device is further provided, and includes:

a processor; and a memory configured to store instructions executable by the processor;

the processor is configured to implement the method as described in the above embodiment.

According to embodiments of the present disclosure, a computer readable storage medium with a computer program stored thereon is provided. The program implements steps of the method in the any embodiment when executed by a processor.

Figure 7:
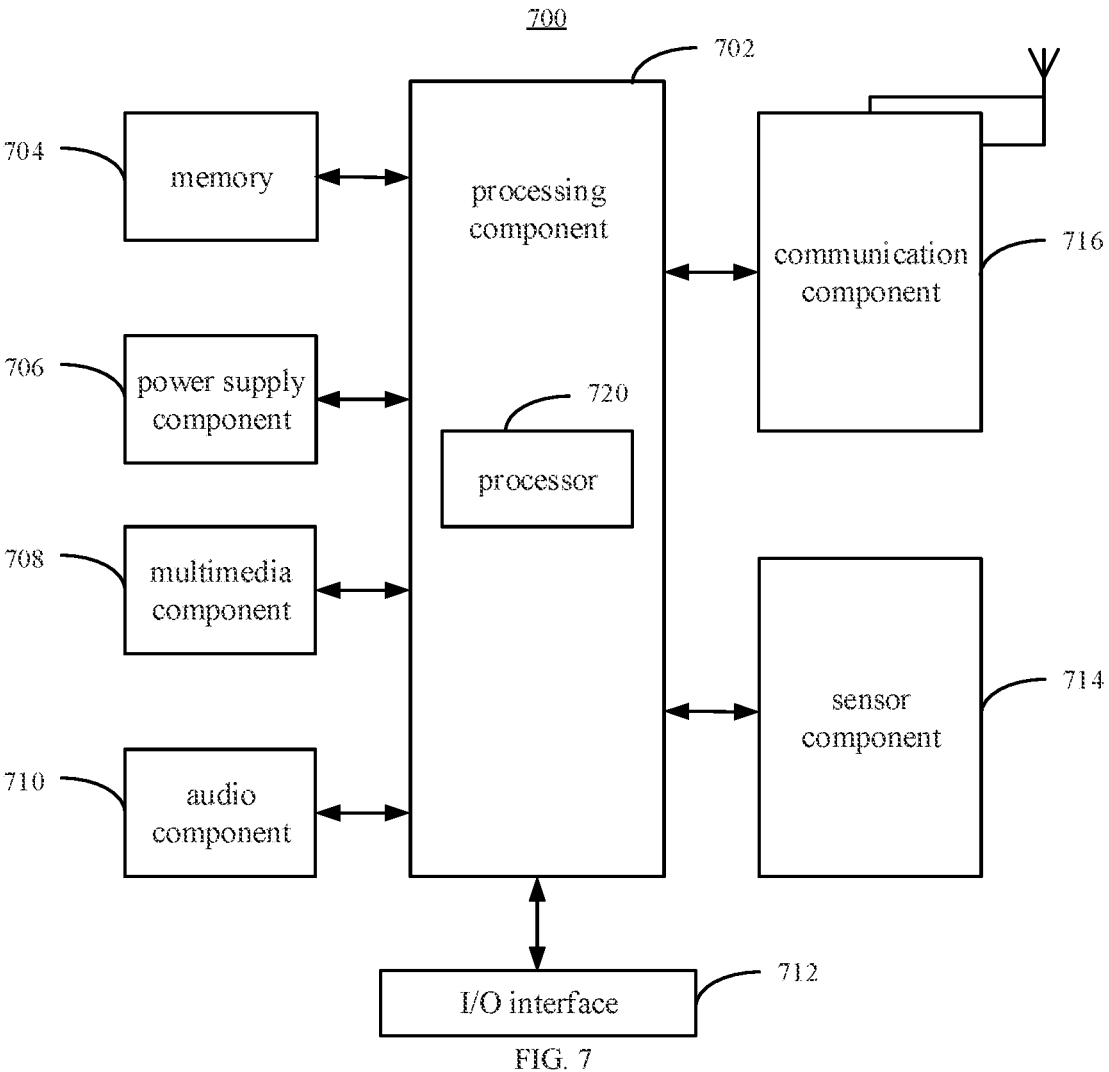
FIG. 7 is a schematic block diagram illustrating an apparatus of for optimizing a blind detection capability according to embodiments of the present disclosure.

FIG. 7 is a schematic block diagram illustrating a device 700 for optimizing a blind detection capability according to embodiments of the present disclosure. For example, the device 700 may be a mobile phone, a computer, a digital broadcasting terminal, a messaging device, a game console, a tablet device, a medical equipment, a fitness equipment, a personal digital assistant, etc.

As illustrated FIG. 7, the device 700 may include one or more components: a processing component 702, a memory 704, a power supply component 706, a multimedia component 708, an audio component 710, an input/output (I/O) interface 712, a sensor component 714, and a communication component 716.

The processing component 702 generally controls the whole operation of the device 700, such as the operations related to display, phone call, data communication, camera operation and recording operation. The processing component 702 may include one or more processors 720 to perform instructions, to complete all or part of steps of the above method. In addition, the processing component 702 may include one or more modules for the convenience of interaction between the processing component 702 and other components. For example, the processing component 702 may include a multimedia module for the convenience of interaction between the multimedia component 708 and the processing component 702.

The memory 704 is configured to store all types of data to support the operation of the device 700. Examples of the data include the instructions of any applications or methods operated on the device 700, contact data, phone book data, messages, pictures, videos, etc. The memory 704 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 706 may provide power supply for all components of the device 700. The power supply component 706 may include power supply management system, a or more power supplies, and other units related to generating, managing and distributing power for the device 700.

The multimedia component 708 includes an output interface screen provided between the device 700 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 708 includes a front camera and/or a rear camera. When the device 700 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 710 is configured as an output and/or input signal. For example, the audio component 710 includes a microphone (MIC). When the device 700 is in an operation mode, such as a call mode, a record mode, and a speech recognition mode, the microphone is configured to receive external audio signals. The audio signals received may be further stored in the memory 704 or sent via the communication component 716. In some embodiments, the audio component 710 further includes a speaker configured to output an audio signal.

The I/O interface 712 provides an interface for the processing component 702 and the peripheral interface module, and the peripheral interface module may be a keyboard, a click wheel, a button, etc. The buttons may include but not limited to a home button, a volume button, a start button and a lock button.

The sensor component 714 includes one or more sensors, configured to provide various aspects of status assessment for the device 700. For example, the sensor component 714 may detect the on/oft state of the apparatus 700 and the relative positioning of the component. For example, the component is a display and a keypad of the apparatus 700. The sensor component 714 may further detect the location change of the apparatus 700 or one component of the apparatus 700, the presence or absence of contact between the user and the apparatus 700, the orientation or acceleration/deceleration of the apparatus 700, and the temperature change of the apparatus 700. The sensor component 714 may include a proximity sensor, which is configured to detect the existence of the objects nearby without any physical contact. The sensor component 714 may further include a light sensor such as a CMOS or CCD image sensor, which is configured in imaging applications. In some embodiments, the sensor component 714 may further include an acceleration transducer, a gyroscope sensor, a magnetic sensor, a pressure sensor or a temperature sensor.

The communication component 716 is configured for the convenience of wire or wireless communication between the device 700 and other devices. The device 700 may access a wireless network based on a communication standard, such as WiFi, 2G or 3G, 4G LIE, 5G NR or their combination. In an exemplary embodiment, the communication component 716 receives broadcast signals or broadcast-related information from an external broadcast management system via a broadcast channel. In an example embodiment, the communication component 716 further includes a near field communication (NFC) module to facilitate short-range communication. For example, an NFC module may be implemented based on radio frequency identification (REID) technology, infrared data association (IRDA) technology, ultra-wideband (MB) technology, bluetooth (BT) technology and other technologies.

In an exemplary embodiment, the device 700 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-transitory computer readable storage medium including instructions is further provided, such as the memory 704 including instructions. The instructions may be executed by the processor 720 of the device 700 to complete the above methods. For example, the non-transitory computer readable storage medium may be a ROM, a random access memory (RAM), a CD-ROM, a magnetic tape, a floppy disk, an optical data storage device, etc.

According to embodiments of the present disclosure, since the blind detection capability is configured for each n time slots, the terminal may flexibly apply the blind detection capability in the n time slots based on actual conditions. For example, when it is determined that the base station configures a PDCCH within a target time slot in four time slots, a full blind detection capability may be applied to the target time slot, in which case, maximum 16 PDCCH candidates and maximum 20 non-overlapped CCEs may be monitored in the target time slot. Accordingly, the blind detection capability will hardly be wasted, and the number of the PDCCH candidates monitored in the target time slot is sufficient, which is beneficial to detecting the PDCCH carrying DCH.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

It should be noted that relational terms such as first and second are used herein to distinguish one entity or operation from another entity or operation without necessarily requiring or implying any such actual relationship or order between such entities or operations. The terms "comprise", "comprising" or any other variations thereof, are intended to cover a non-exclusive inclusion, such that a process, a method, an article or a device including a series of elements not only includes those elements but also includes other elements not expressly listed, or may further include elements inherent to such process, method, article, or device. In the absence of more constraints, the elements defined by a sentence "comprising one" do not preclude the presence of additional same elements in the process, method, article, or apparatus that includes the elements.

The above are detailed descriptions of embodiments of the present disclosure. Specific examples are applied to elaborate principles and implementations of the present disclosure. The descriptions of the above embodiments are only configured to help understand the method and core concepts of the present disclosure; at the same time, for those skilled in the art, there may be changes in the specific implementation and application scope according to the idea of the present disclosure. In summary, the contents of the summary should not be construed as a limitation of the present disclosure.

What is claimed is:

1. A method for optimizing a blind detection capability, performed by a terminal, the method comprising:
   determining blind detection capability information, wherein the blind detection capability information comprises a maximum number of physical downlink control channel (PDCCH) candidates monitored in n time slots under a first subcarrier spacing, and a maximum number of non-overlapped control channel elements (CCEs) in the n time slots under the first subcarrier spacing, where n is an integer greater than 1;
   receiving resource information of a PDCCH sent by a base station;
   determining a target time slot where the PDCCH is located in the n time slots based on the resource information; and
   performing a blind detection on downlink control information in the PDCCH in the target time slot based on the blind detection capability information;
   wherein the resource information comprises a control resource set and a search space.

2. The method according to claim 1, wherein the blind detection capability information further comprises a maximum number of PDCCH candidates monitored in each time slot under a second subcarrier spacing and a maximum number of non-overlapped CCEs in each time slot under the second subcarrier spacing, wherein the second subcarrier spacing is less than the first subcarrier spacing.

3. The method according to claim 2, wherein the second subcarrier spacing is one of 15 KHz, 30 KHz, 60 KHz, or 120 KHz.

4. An electronic device, comprising:

a processor; and a memory configured to store instructions executable by the processor;

wherein the processor is configured to:

determine blind detection capability information, wherein the blind detection capability information comprises a maximum number of physical downlink control channel (PDCCH) candidates monitored in n time slots under a first subcarrier spacing, and a maximum number of non-overlapped control channel elements (CCEs) in the n time slots under the first subcarrier spacing, where n is an integer greater than 1;

receive resource information of a PDCCH sent by a base station;

determine a target time slot where the PDCCH is located in the n time slots based on the resource information; and perform a blind detection on downlink control information in the PDCCH in the target time slot based on the blind detection capability information;

wherein the resource information comprises a control resource set and a search space.

5. The electronic device according to claim 4, wherein the blind detection capability information further comprises a maximum number of PDCCH candidates monitored in each time slot under a second subcarrier spacing and a maximum number of non-overlapped CCEs in each time slot under the second subcarrier spacing, wherein the second subcarrier spacing is less than the first subcarrier spacing.

6. The electronic device according to claim 5, wherein the second subcarrier spacing is one of 15 KHz, 30 KHz, 60 KHz, or 120 KHz.

7. A non-transitory computer readable storage medium having stored thereon a computer program that, when executed by a processor, cause the processor to perform a method for optimizing a blind detection capability, the method comprising:

determining blind detection capability information, wherein the blind detection capability information comprises a maximum number of physical downlink control channel (PDCCH) candidates monitored in n time slots under a first subcarrier spacing, and a maximum number of non-overlapped control channel elements (CCEs) in the n time slots under the first subcarrier spacing, where n is an integer greater than 1;

receiving resource information of a PDCCH sent by a base station;

determining a target time slot where the PDCCH is located in the n time slots based on the resource information; and performing a blind detection on downlink control information in the PDCCH in the target time slot based on the blind detection capability information;

wherein the resource information comprises a control resource set and a search space.

8. The non-transitory computer readable storage medium according to claim 7, wherein the blind detection capability information further comprises a maximum number of PDCCH candidates monitored in each time slot under a second subcarrier spacing and a maximum number of non-overlapped CCEs in each time slot under the second subcarrier spacing, wherein the second subcarrier spacing is less than the first subcarrier spacing.

9. The non-transitory computer readable storage medium according to claim 8, wherein the second subcarrier spacing is one of 15 KHz, 30 KHz, 60 KHz, or 120 KHz.

* * * * *